US011962641B2

(12) United States Patent
Cai

(10) Patent No.: US 11,962,641 B2
(45) Date of Patent: Apr. 16, 2024

(54) LOCAL CONTENT SERVING AT EDGE BASE STATION NODE

(71) Applicant: T-Mobile Innovations LLC, Overland Park, KS (US)

(72) Inventor: Zheng Cai, Fairfax, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/645,580

(22) Filed: Dec. 22, 2021

(65) Prior Publication Data

US 2023/0199057 A1    Jun. 22, 2023

(51) Int. Cl.
*G06F 15/173* (2006.01)
*H04L 67/06* (2022.01)
*H04W 4/02* (2018.01)
*H04W 88/16* (2009.01)

(52) U.S. Cl.
CPC ............ *H04L 67/06* (2013.01); *H04W 88/16* (2013.01)

(58) Field of Classification Search
None
See application file for complete search history.

(56) References Cited

U.S. PATENT DOCUMENTS

| 8,224,968 B1* | 7/2012 | Chen ................... H04L 67/1063 709/227 |
| 2003/0005035 A1* | 1/2003 | Rodgers ................ G06F 16/958 709/219 |
| 2006/0168318 A1* | 7/2006 | Twiss .................... H04L 67/104 709/238 |
| 2008/0154879 A1* | 6/2008 | Lin ...................... G06F 16/9535 707/999.005 |
| 2011/0099226 A1* | 4/2011 | Liu ....................... H04L 67/563 709/226 |
| 2012/0309425 A1* | 12/2012 | El Khayat ............... H04W 4/80 455/456.3 |
| 2014/0258366 A1* | 9/2014 | L'Heureux .......... H04L 67/568 709/218 |
| 2015/0033255 A1* | 1/2015 | Neumann ........... H04N 21/8456 711/135 |
| 2021/0112034 A1* | 4/2021 | Sundararajan ........ H04L 47/726 |

* cited by examiner

*Primary Examiner* — Clayton R Williams
*Assistant Examiner* — Ho T Shiu
(74) *Attorney, Agent, or Firm* — SHOOK, HARDY AND BACON L.L.P.

(57) ABSTRACT

A method for locally serving content is described. The method includes receiving, at a gateway device, a first request for a data file via a first user device communicatively coupled to the gateway device. The data file is received at the gateway device from an external server and sent to the first user device. A data record is stored to a storage device indicating that the data file has been sent to the first user device. A second request for the data file is later received at the gateway device from a second user device communicatively coupled to the gateway device. In response to the receiving of the second request, the data record is accessed and causes a computer read of the data record. The first user device is then instructed to transfer the data file to the second user device, via the gateway device, based upon the computer read.

19 Claims, 6 Drawing Sheets

LOCAL CONTENT SERVING AT EDGE BASE STATION NODE

SUMMARY

The present disclosure is directed, in part, to utilizing a user plane function of a network (such as 5G) to rapidly serve content to user equipment that is local to an edge base station node. Local serving of content reduces the need to repetitively request the content from an external content server. Local service thus reduces traffic over the wireless communications network by keeping one or more local copies of the content (such as on the node, on user equipment, or in another data store). The reduced traffic allows for faster transfers of other data over the network, reduces wait times, greater connectivity, and other benefits.

Some embodiments of the present disclosure are configured to serve "viral" content, such as videos, images, audio, applications, and other files. Such viral content may gain rapid popularity across numerous user equipment on the network in a relatively short time frame. Thus embodiments may identify currently served content as "viral" or otherwise high-frequency and designate the content for local storage and service upon future requests.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
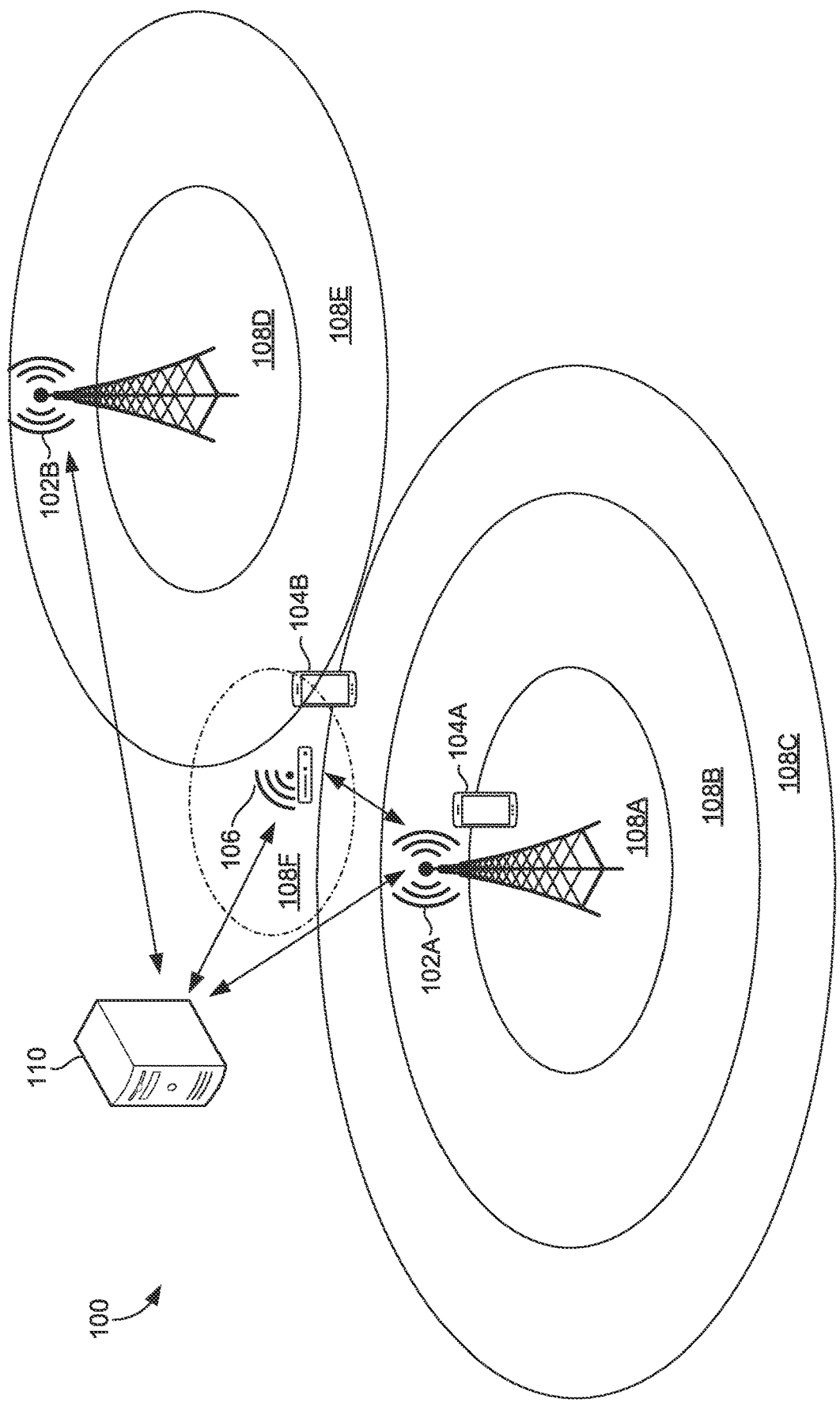
FIG. 1 is a diagram of a wireless communications network in which one or more aspects of the present disclosure may be carried out.

The subject matter of aspects herein is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional wireless communication network employs one or more base stations to provide wireless access to a network. For example, in a wireless telecommunication network, a plurality of access points, each providing service for a cell or a sector of a cell, are used to transmit and receive wireless signals to/from one or more UEs. An access point may be considered to be one or more otherwise-discrete components comprising an antenna, a radio, and/or a controller, and may be alternatively referred to as a "node," in that it is a point of origin for the communication link between the wired and wireless portions of the communication system. In aspects, a node may be defined by its ability to communicate with a UE according to a single protocol (e.g., 3G, 4G, LTE, 5G, and the like); however, in other aspects, a single node may communicate with a UE according to multiple protocols.

As used herein, the terms "cell" or "node" may be specific nodes, base stations, or access points that can be considered to be discrete from one another. While cells and nodes may be referred to herein with respect to its protocol, it should be understood that any particular cell or node may be capable of operating in any one or more of any suitable wireless communication protocol, using any one or more frequencies, frequency bands, channels, and the like. The terms "user device," "user equipment," "UE," "mobile device," "mobile handset," and "mobile transmitting element" may be used interchangeably in this description.

Accordingly, a first aspect of the present disclosure is directed to a computerized method. The method includes receiving, at a gateway device, a first request for a data file via a first user device communicatively coupled to the gateway device. The data file is received at the gateway device from an external server and sent to the first user device. A data record is stored to a storage device indicating that the data file has been sent to the first user device. A second request for the data file is later received at the gateway device from a second user device communicatively coupled to the gateway device. In response to the receiving of the second request, the data record is accessed and causes a computer read of the data record. The first user device is then instructed to transfer the data file to the second user device, via the gateway device, based upon the computer read.

A second aspect of the present disclosure is directed to a computerized method that includes receiving, at a gateway device, a request from a first cell phone communicatively coupled to the gateway device, wherein the request is for a data file from an external server; accessing, in response to the receiving of the request, a data record and causing a computer read of the data record, wherein the data record is indicative of the data file being on a second cell phone communicatively coupled to the gateway device; and instructing that the data file be sent to the first user device from the second user device in lieu of the external server.

A third aspect of the present disclosure is directed to a method that includes receiving, at a gateway device, a first request for a data file from a first user device communicatively coupled to the gateway device. The method further includes receiving, at the gateway device, the data file from an external server. The method further includes sending the data file to the first user device. The method further includes identifying the data file as a high-frequency file that is likely to be requested by another user device. The method further includes storing, based upon said identifying, the data file at the gateway device. The method further includes receiving a second request for the data file from a second user device. The method further includes sending the stored data file from the gateway device to the second user device.

According to another aspect of the technology described herein, a system may include a base station and a user equipment in communication with the base station. The base station and the user equipment may each perform one or more of the steps described herein. According to yet another aspect of the technology described herein, a non-transitory computer readable storage medium having a computer program stored thereon. When executed by one or more processors, the computer program instructs the one or more processors to perform one or more of the steps described herein.

Referring to FIG. 1, a diagram of a wireless communications network 100 in which one or more aspects of the present disclosure may be carried out is depicted. The diagram may illustrate one or more features and an example environment for embodiments of the present disclosure. Wireless communications network 100 is shown as having a number of components and associated devices therein. The wireless communications network 100 includes base stations 102 (shown as 102A and 102B in FIG. 1). Base station 102 communicates with one or more UEs 104 (shown as 104A and 104B in FIG. 1) that are disposed within a coverage range of the base station 102. The wireless communications network 100 may also include one or more distributed stations 106 that may be partially or fully within the coverage area of the base station 102. The base station 102 projects one or more frequency regions 108 (shown as 108A-C associated with base station 102A and 108D-E associated with base station 102B in FIG. 1) that include at least a portion of a band including one or more frequencies that the UE 104 may use to communicate with the base station 102. Similarly, the distributed stations 106 may also project a distributed frequency region 108F.

Wireless communications network 100 may be a 5G network, a 4G network, or other telecommunications networks. The wireless communications network 100 facilitates communication between the UEs 104 and an external computing device, via the base station 102 and/or the distributed stations 106. The wireless communications network 100 may facilitate phone calls, text messages, Internet access, and/or other communications.

The base station 102 and/or distributed station 106 may assist the UE 104 in accessing the wireless communications network 100. This connection to the wireless communications network 100 may be described in the ETSI 125-136 series, the 3GPP 25/36 series specifications, the ETSI 138 series, and/or the 3GPP 38 series specifications. In some embodiments, this connection to the wireless communications network 100 may be described in another or a yet-to-be established (such as 6G) specification. The base station 102 and/or distributed station 106 may assist the UE 104 by providing network-selection assistance data to the UE 104. The network-selection assistance data is indicative of a recommended frequency or frequencies that the base station 102 recommends for the UE 104.

The UE 104 may also be referred to as a user device, a cell phone, a smart phone, or the like. The term "user equipment" or "UE" may be described in the Universal Mobile Telecommunications System (UMTS) and/or the 3GPP Long Term Evolution (LTE) as any electronic device utilized directly by an end-user to communicate. Examples include a hand-help smart phone, a traditional cellular phone, a laptop computer equipped with a mobile broadband router (external or internal), a tablet computer with a mobile broadband router, etc. In some embodiments, the UE utilized in certain methods may be a modern 5G-enabled smartphone. The UE may include an advanced and/or powerful processor, such as to enable 5G communications. This advanced and/or powerful processor may have computational capacity that is available (e.g., otherwise untapped) during certain periods in combination with advanced communications elements and storage on the UE. Aspects may utilize the processor, communications element, and storage of the UE to locally serve content, as discussed herein.

Distributed stations 106 may cover a relatively small geographic area with the distributed frequency region 110, compared with the frequency regions 108 of the base station 102. The distributed station 106 may be unaffiliated with the base station 102 and/or may be temporary. The distributed station 106 may also be referred to as an "unplanned cell," a "femtocell", a "pico cell," a "micro cell," a "metro cell," a "small cell," a "fixed relay," or the like. For example, a femtocell may be disposed in a home or business and provide coverage for up to 32 users in a range of up to 100 meters. As another example, a pico cell may be disposed in a large shopping mall or airport and provide coverage for up to 128 users in a range of up to 200 meters. Yet another example, a micro cell may be disposed in a large urban area to fill coverage gaps between base stations 102 and provide coverage for up to 256 users in a range of up to 1000 meters.

Especially with the implementation of 5G, unplanned and irregular placements of access nodes (including the base station 102 and the distributed stations 106) may become more common due to the impassability and limited range of the high-frequency signals. For example, the distributed stations 106 may be placed in common public areas such as restaurants and shopping malls to supplement weaker signals from a base station 102. This arrangement of base stations 102 and distributed stations 106 may be referred to as a heterogeneous network environment. Thus, aspects assist the user equipment in identifying and connecting to these distributed stations 106 in a heterogeneous network environment.

Frequency regions 108 are geographic areas covered by at least a portion of a certain frequency band. For example, frequency region 108A may be covered by a first band, frequency region 108B may be covered by a second band, distributed frequency region 108C may be covered by a third band, etc. While in FIG. 1 these frequency regions 108 are shown as ovals, in reality the frequency regions 108A-E and distributed frequency regions 108F often have an irregular shape due to the terrain, buildings, and other physical features in the geographic location. The frequency regions 108 are also not constant in size and shape and can change due to changing conditions such as weather, interference, and other equipment. Specifically, higher frequency 5G signals are less likely to penetrate solid objects such as walls and trees at least in part because of the nature of high-frequency electromagnetic waves. The frequency region may be considered when selecting one or more UEs for storage and service of content, as discussed herein.

Figure 2:
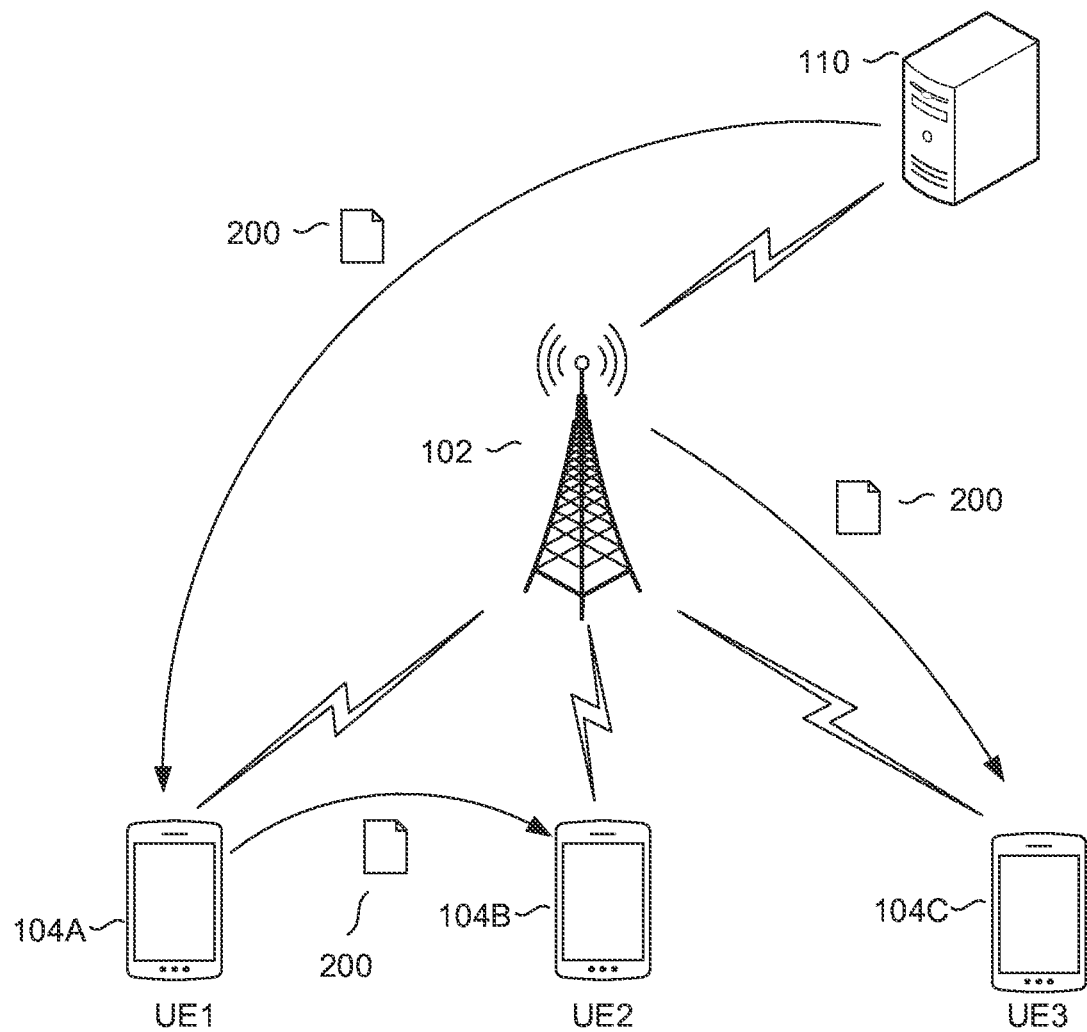
FIG. 2 is a graphical representation of example interactions between components of the wireless communications network in which one or more aspects of the present disclosure may be carried out.
Figure 4:
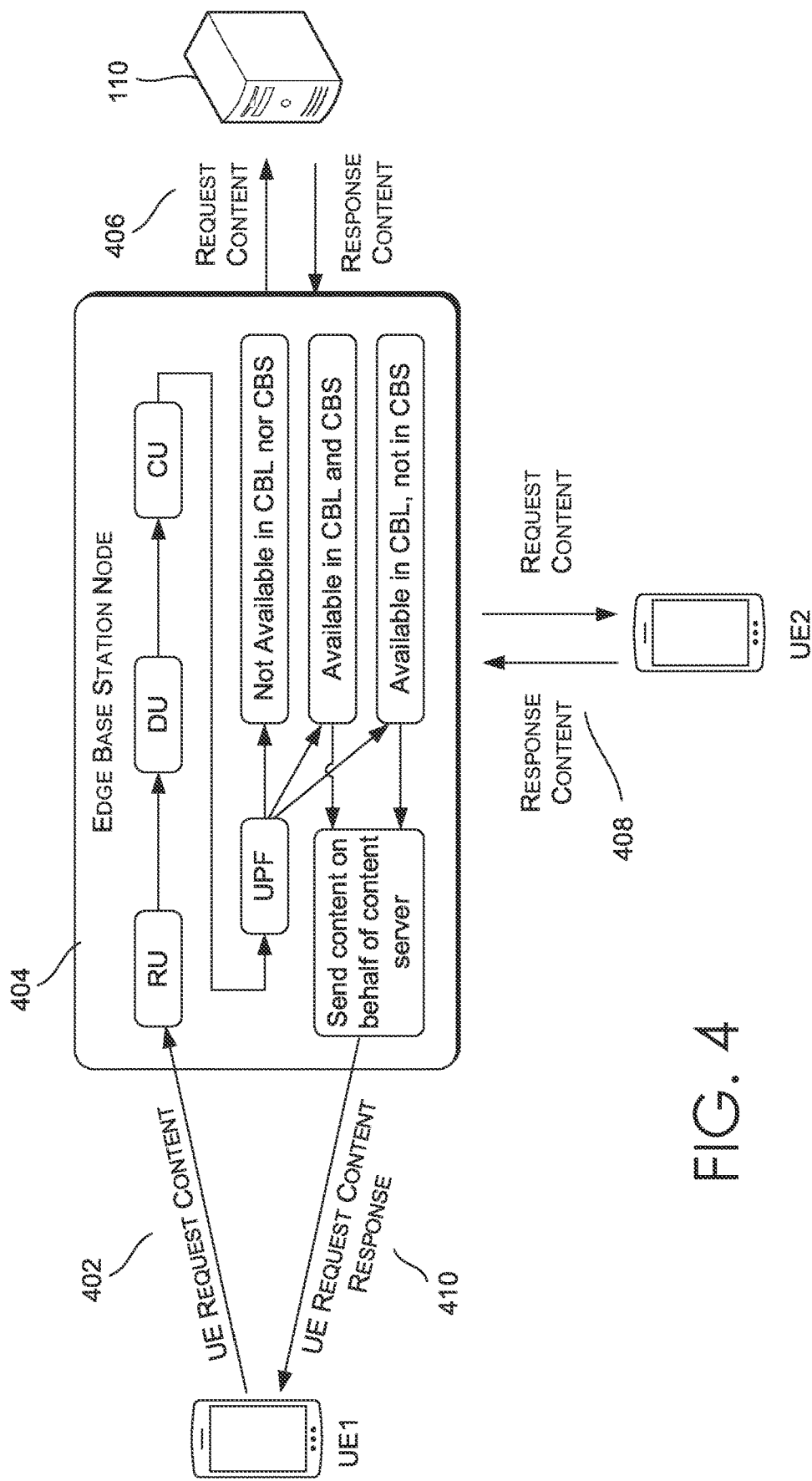
FIG. 4 is a flow diagram of one aspect of a method of serving content locally in the wireless communications network.

An external server 110 is communicatively coupled to one or more base stations 102 and/or distributed stations 106. The base stations 102 and/or distributed stations 106 provide an intermediary between the UEs 104 and the external server 110. In traditional systems, all requests for content are forwarded to the external server 110 for processing and service, the external server 110 being outside and not under control of the wireless communications network. However, as shown in FIG. 2, embodiments of the invention process those requests locally if possible and only forward the requests to the external server 110 if the request cannot be fulfilled locally (as best illustrated in FIG. 4). In addition to decreasing the service time, moving to a local content server (e.g., one or more UEs or nodes) under the control of the wireless communications network may provide other benefits such as prioritization not available under traditional systems. In other embodiments, the external server 110 is a component of the gNB function.

FIG. 2 shows an example embodiment of the present disclosure. An external content server is communicatively coupled to the node. The node is communicatively coupled to one or more UEs. Shown in the example FIG. 2, the node is communicatively coupled to three UEs, marked as UE1 104A, UE2 104B, and UE3 104C. In this example, content 200 will be served to the various UEs 104. The content 200 may be any of various data, such as a video file, an audio file, an image file, an application, a set of files, etc. The content 200 may include metadata about the file or files included in the content.

Content 200 may be initially requested by UE1, in a communication to the node 102. The node 102, having no record or local storage of that content, forwards the request onto the external content server 110. The external content server 110 then provides the content 200 to UE1 via the node 102. In embodiments of the invention, the external content server 110 is external to the communications network. Examples of the external content server 110 is an application server, a data stream management system, a blade server, a cloud computing node, etc. In embodiments, the external content server 110 is controlled by and/or otherwise associated with an external entity. Examples of external entities include NETFLIX, TIKTO, YOUTUBE, etc. In other embodiments, the content server is in the core network. This is a component of the communications network.

At a subsequent time, UE2 requests the same content 200 that UE1 previously requested. The node 102 processes the requests and reads a record that the content 200 was previously served to UE1. Node 102 may then request that the content 200 be served from UE1 instead of from the external server 110, to reduce traffic at the external server 110 and across the communications network. Additionally, or alternatively, the node 102 may store the content 200 locally at the node 102. In these embodiments, when a request for the content 200 is received from UE3, the node 102 may determine whether a local copy of the content 200 is at the node 102. Upon identifying the content 200, the node 102 may serve the content 200 directly from the node 102, instead of from UE1 or the external content server 110. In these ways, UE2 and UE3 may be locally served the content with no or a limited amount of traffic being sent across the communications network.

Figure 3:
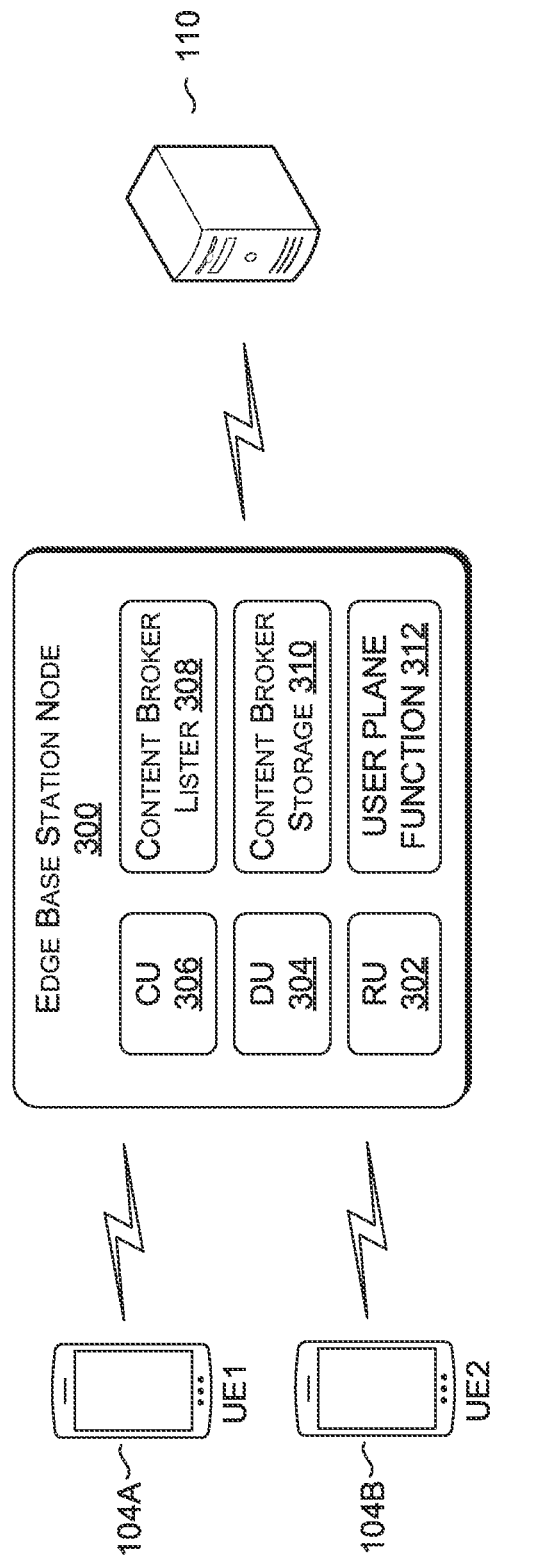
FIG. 3 is a graphical representation of an edge base station node in which one or more aspects of the present disclosure may be carried out.

Referring to FIG. 3, an example embodiment of aspects herein used in an Open Radio Access Network (RAN) architecture is shown and described. Previous RAN architectures (such as 2G, 3G and 4G) are at least partially monolithic, having few interactions happened between logical nodes. However, the New Radio (NR) may divide the gNB (the NR logical node) between Central Units (CUs) and Distributed Units (DUs) for increased flexibility. Flexible hardware and software implementations allow scalable, cost-effective network deployments—but only if hardware and software components are interoperable and can be mixed and matched from different vendors. A split architecture (between central and distributed units) allows for coordination for performance features, load management, real-time performance optimization and enables adaptation to various use cases and the quality of service (QoS) that needs to be supported (i.e. gaming, voice, video), which have variable latency tolerance and dependency on transport and different deployment scenarios, like rural or urban.

Mobile operators may deploy a functional split architecture that openly interfaces through an edge base station node 300 including (or otherwise associated with) an RU 302, a DU 304, a CU 306, a content broker lister 308, a content broker storage 310, and a user plane function (UPF) 312 in some combination.

The radio unit (RU) 302 at least partially controls the digital front end (DFE) and the parts of the physical (PHY) layer, as well as the digital beamforming functionality. The distributed unit (DU) 304 is in close physical proximity to the RU. The UEs communicated with the DU 304 through the RU 302. The DU 304 at least partially may control the radio link control (RLC), the medium access layer (MAC), and parts of the PHY layer. This logical node includes a subset of the eNB/gNB functions, depending on the functional split option, and its operation is controlled by the CU 306. The centralized unit (CU) 306 at least partially controls the Radio Resource Control (RRC) and Packet Data Convergence Control (PDCP) layers. The gNB may consist of a CU and a DU where the CU is composed of CU-UP and CU-CP via E1 interface. The split architecture enables a 5G network to utilize different distribution of protocol stacks between CU and DUs depending on midhaul availability and network design. It is a logical node that includes the gNB functions like transfer of user data, mobility control, RAN sharing (MORAN), positioning, session management etc., with the exception of functions that are allocated exclusively to the DU. The CU controls the operation of several DUs over the midhaul interface.

The Open RAN environment includes a centralized unit (CU) 306 communicatively coupled with a distributed unit (DU) 304. The DU 304 is associated with a radio unit (RU) 302. The DU 304 communicates with user equipment (UE), via the RU 302.

In aspects, the DU 304 sends messages to and receives messages from the UE. As a first example, the DU 304 may send one of the UE a network status message, indicative of a current status of the DU 304 and/or the Open RAN network 200 generally. As a second example, the UE may send a content request message or network capability status message to the DU 304, indicative of requested content of the UE. The content request message may be sent in response to a content availability message from the DU 304. As a third example, the UE may send a content message to the DU 304. The content message may include or otherwise be indicative of the requested content 200.

The content broker lister 308 may be stored on the DU 304, the CU 306, an external server or data store, or other component of the edge base station node 300. The content broker lister 308 includes information indicative of the various content 200 that has been or is available for local service. The content broker lister 308 may list content that is available in the content broker storage 310, in one or more UEs, or in another data store. Embodiments of the present disclosure relate to the serving of "viral" content to UEs. As such, the content broker lister 308 may be updated to include new viral content and culled to remove no-longer-viral content. Viral content may be identified internally or externally. For example, a processor of the edge base station node 300 may identify the content data file as a high-frequency file that is likely to be requested by another user device. This determination may be based upon current and/or past requests, an indication from the CU to the DU, an indication from the external content server to the CU or DU, or other indication of virality. Upon receiving a request for content, the processor may access the content broker lister 308 (which may be referred to as a list of high-frequency files) to determine if the requested content data file is indicated on the list. Using the list, the processor may determine if and where the content is located. The processor may then process the request by providing the content directly, instructing a UE to send the content data file, etc.

The content broker storage 310 may store content locally at the DU 304 and/or CU 306. Content 200 may be stored locally in the edge base station node 300 to provide for more rapid provision of the content, to reduce external traffic across the communications network, to reduce server load at the external server 110, or may provide other technological benefits. In some embodiments, the content broker storage 310 may be at least partially at the UE, such that content previously served to the UE may be later retrieved and served to other UEs on the local network of the edge base station node 300.

The user plane function (UPF) 312 is a component of the 5G infrastructure architecture. The UPF determines what to do with packets arriving at an inbound interface, such as the CU. The UPF may access a table of destination addresses of the packets to determine the appropriate destination or route in which to send those packets. The UPF may have information of each mobile user communicatively coupled to the edge base station node 300 for the contents that were stored, including the access information. In some embodiments, each time a user equipment finishes its registration to the mobile network, it may send a content report which has its application content information, including a content name, version, size, and download date (etc.). Each time when the mobile device finishes its download of a new content or deletes an existing content, it will send content update information to the base station. Each time when a mobile device wants to download content, the UPF will check if this content is available within the base station node 300. If it is not, the UPF may check if it is in the neighbor base station node or other local or semi-local location. If the application is available within the base station node 300, the base station will get the content from the UE that stored it and act as if it is the content server. The base station node 300 will then send the content to the UE that requested it. If neither the base station nor the neighbor base station(s) has the content, the request will be forwarded to the actual content server for service in the traditional manner.

FIG. 4 depicts a flow diagram of an exemplary method for identifying local copies of data files instead of accessing from an external content server. Steps of the method may be performed by the UE, by a base station, by a distributed station, or by some combination thereof. The steps may also be performed in any order. Two or more steps may be performed simultaneously.

A processor of the base station node 300 (e.g., at the base station 102 or distributed station 106 of FIG. 1) communicates with the user equipment. The communication is over a mobile communications network, such as mobile communications network 100 of FIG. 1. Information related to the current and/or past content of the UE may be sent to the distributed station. The user equipment information is indicative of properties of the user equipment that may affect which, if any, content may be served. The user equipment information may include a UE manufacturer name, a UE model name or number, a type of antenna or information about the antenna, a type of processor, an amount of non-volatile memory, an amount of volatile memory, etc. The user equipment information may include status information, such as a current operational mode of the UE, a current geographic location of the UE, a current signal strength received, a current speed and direction of travel, and other information. The user equipment information may also include historical information from the UE. As part of this step, the processor may monitor a status of the one or more UEs in communication therewith. Monitoring the status may include receiving an updated reporting message from the user equipment (which may include information about new content downloaded, stored, or deleted), determining an updated geographic location for the user equipment, determining an updated signal strength for the user equipment, etc. The processor may monitor the status so as to be able to select one or more UEs to serve the content (discussed below). For example, without monitoring the status, the processor may select a UE that has subsequently left the geographic range, deleted the content, or has a diminished communication capacity.

In Step 402, the processor may receive, at a gateway device, a first request for a content data file via a first user device (UE1) communicatively coupled to the gateway device. As used herein, a "gateway device" may include any computing device that is an intermediary between other computing devices. The gateway device may direct traffic from one computing device to another. Examples of gateway devices may include the discussed base station 102, the distributed station 106, the base station node 300, or other computing devices. The user device may be a cellphone connected to the communications network through the gateway device. The request may identify the requested content in any of numerous ways, including via a resource address.

In Step 404, the processor analyzes the request to determine how to meet the request. In some embodiments, the gateway device is a base station node of a communications network that utilizes a user plane function (UPF) of a 5G network. The request is received at the RU and sent to DU for initial processing. The request may be sent to the CU for further fulfillment. The CU utilizes the UPF to determine how and where to direct the request to best facilitate serving of the requested content. The UPF may determine if the requested content is located in the local content broker storage (CBS) and/or listed in the content broker lister (CBL). It should be appreciated that the content stored in the CBS may be listed in the CBL. As such, the UPF may consult the CBL to determine where, if at all, the content is stored. The UPF may perform or instruct a machine read of the CBL to determine if information indicative of the content is present in the CBL. Based upon the machine read, the UPF may determine a status of the content. As a first example, the UPF may determine that the content is not available on the CBL nor the CBS. In such a finding, the processor may need to request the content from an external server, as discussed below. As a second example, the UPF may determine that the content is available in both the CBL and the CBS. In such a finding, the processor may determine that the most resource efficient step will be to serve the content from the CBS. As a third example, the UPF may determine that the content is listed on the CBL but not available in the CBS. In such a finding, the processor may determine that the content should be served from a UE identified in the CBL as having the content.

In step 406, in response to determining that the requested content is not available at the CBS or the CBL, the processor requests content from the external content server and receives, at the gateway device, the content data file from the external content server. In Step 408, in response to determining that the requested content is available at the CBL but not the CBS, the processor may request content from a second user device (UE2) communicatively coupled to the gateway device.

In Step 410, the processor may send the data file to the first user device. The data file may have been received from the external content server (as discussed in Step 406), from another UE (as discussed in Step 408), or from the CBS (as identified from the CBL).

Further, the processor may store, to a storage device, a data record indicating that the data file has been sent to the first user device and/or that the data file is a high-frequency file that is likely to be requested by another user device. Later, upon receiving, at the gateway device, a second request for the data file from a second user device communicatively coupled to the gateway device, the processor may access, via the storage device, the data record and causing a computer read of the data record. Based on the computer read, the processor may instruct the first user device to transfer the data file to the second user device, via the gateway device.

In embodiments, one or more of the above-discussed steps may be performed by the user equipment. In other embodiments, one or more of the above-discussed steps may be performed by the base station and one or more of the above-discussed steps may be performed by the user equipment. In still other embodiments, one or more of the above-mentioned steps may be performed by the distributed station. In yet still other embodiments, one or more of the above-discussed steps may be performed by the distributed station and one or more of the above-discussed steps may be performed by the user equipment.

Figure 5:
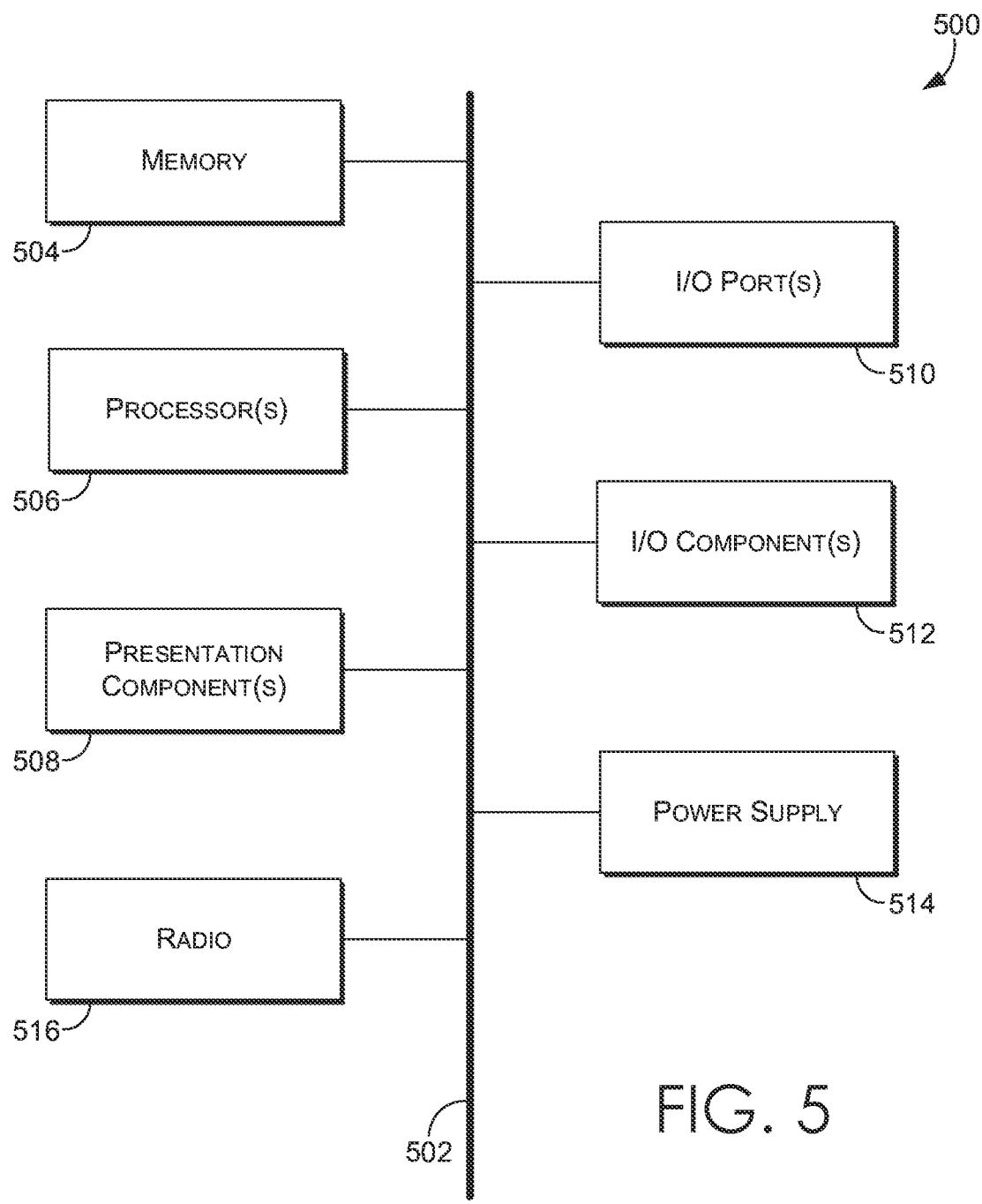
FIG. 5 is a diagram of a computing environment suitable for use in implementations of the present disclosure.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of aspects described herein. Neither should computing device 500 be interpreted as having any dependency nor requirement relating to any one or combination of components illustrated. In aspects, the computing device 500 may be a UE 104, WCD, or other user equipment, capable of two-way wireless communications with an access point. Some non-limiting examples of the computing device 500 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, and power supply 514. Bus 502 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory.

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 508 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. In aspects, the radio 516 utilizes one or more transmitters, receivers, and antennas to communicate with the wireless telecommunications network on a first downlink/uplink channel. Though only one radio is depicted in FIG. 1, it is expressly conceived that the computing device 500 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 516 might additionally or alternatively facilitate other types of wireless communications including Wi-Fi, WiMAX, LTE, 5G NR, or other VoIP communications. As can be appreciated, in various embodiments, radio 516 can be configured to support multiple technologies and/or multiple radios can be utilized to support multiple technologies. A wireless telecommunications network might include an array of devices, which are not shown so as not to obscure more relevant aspects herein. Components such as a base station 102, a communications tower, or even access points (as well as other components) can provide wireless connectivity in some embodiments.

Figure 6:
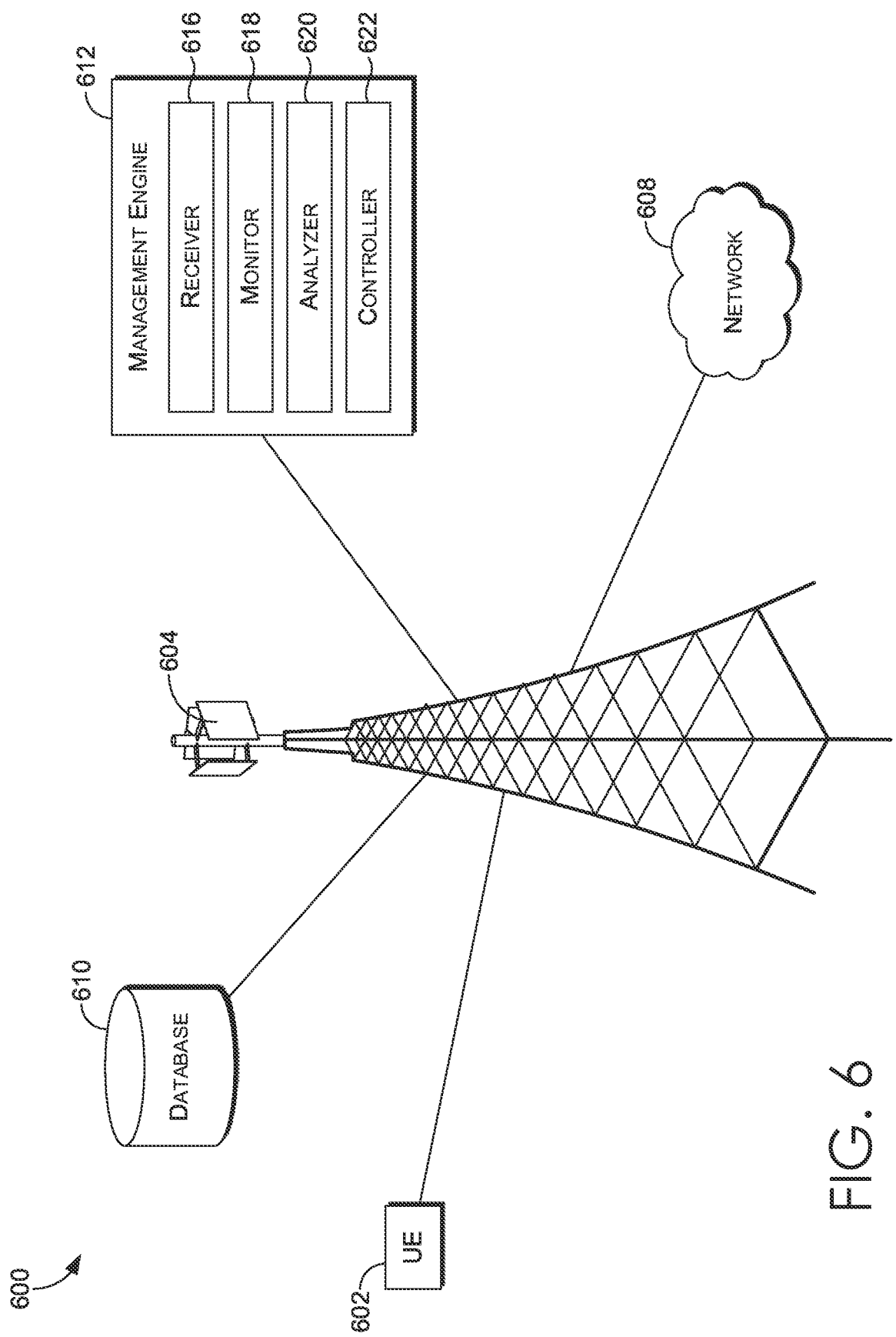
FIG. 6 illustrates a network environment in which implementations of the present disclosure may be employed.

FIG. 6 provides an exemplary network environment in which implementations of the present disclosure may be employed. Such a network environment is illustrated and designated generally as network environment 600. Network environment 600 is but one example of a suitable network environment and is not intended to suggest any limitation as to the scope of use or functionality of aspects. Neither should the network environment be interpreted as having any dependency or requirement relating to any one or combination of components illustrated.

Network environment 600 includes user equipment 602, a first node 604, network 608, database 610, and management engine 612. In network environment 600, the user equipment 602 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 500) that wirelessly communicates via with a node of the wireless network, such as the first node 604, in order to interact with one or more components of the network 608.

In some aspects, the user equipment 602 can correspond to computing device 500 in FIG. 1. Thus, a user equipment can include, for example, a display(s), a power source(s) (e.g., a battery), a data store(s), a speaker(s), memory, a buffer(s), a radio(s) and the like. In some implementations, the user equipment 602 comprises a wireless or mobile device with which a wireless telecommunication network(s) can be utilized for communication (e.g., voice and/or data communication). In this regard, the user equipment can be any mobile computing device that communicates by way of a wireless network, for example, a 3G, 4G, 5G, or any other type of network. Further, the user equipment 602 may communicate with the node 604 on any one or more frequencies, frequency bands, channels, or the like. Though only the node 604 is depicted in FIG. 2, it should be understood that the user equipment 602 may be capable of connecting to any one or more of a plurality of nodes, using any one or more of a plurality of communication protocols, on any one or more of a plurality of frequencies.

In some cases, the user equipment 602 in network environment 600 can optionally utilize network 608 to communicate with other computing devices (e.g., a mobile device(s), a server(s), a personal computer(s), etc.) through the node 604. The network 608 may be a telecommunications network(s), or a portion thereof. A telecommunications network might include an array of devices or components (e.g., one or more base stations 102), some of which are not shown. Those devices or components may form network environments similar to what is shown in FIG. 2 and may also perform methods in accordance with the present disclosure. Components such as terminals, links, and nodes (as well as other components) can provide connectivity in various implementations. Network 608 can include multiple networks, as well as being a network of networks, but is shown in more simple form so as to not obscure other aspects of the present disclosure.

Network 608 can be part of a telecommunication network that connects subscribers to their immediate service provider. In some instances, network 608 can be associated with a telecommunications provider that provides services (e.g., voice, data, SMS) to user devices, such as user equipment 602. For example, network 608 may provide voice, SMS, and/or data services to user equipment or corresponding users that are registered or subscribed to utilize the services provided by a telecommunications provider. Network 608 can comprise any one or more communication networks providing voice, SMS, and/or data service(s), such as, for example, a 1× circuit voice, a 3G network (e.g., CDMA, CDMA2000, WCDMA, GSM, UMTS), a 4G network (WiMAX, LTE), or a 5G network.

In some implementations, the first node 604 is configured to communicate with user equipment, such as the user equipment 602 that are located within the geographical area, or cell, covered by the one or more antennas of the first node 604. Though referred to as a node for simplicity, the first node 604 may include (or be communicatively coupled to) one or more base stations 102, distributed stations, nodes, base transmitter stations, radios, antennas, antenna arrays, power amplifiers, transmitters/receivers, digital signal processors, control electronics, GPS equipment, and the like. In particular, the node 604 may transmit a downlink signal to the user equipment 602 in an effort to establish a wireless communication session. The user equipment 602 may perform a cell selection/reselection procedure wherein the user equipment 602 makes various determinations, measurements, and/or observations about one or more network parameters. If the user equipment 602 selects (or reselects) the cell comprising node 604, the user equipment 602 may, in return, attempt to communicate an uplink signal back to the node 604.

The first node 604 may be in communication with the management engine 612, which comprises various components that are utilized, in various implementations, to perform one or more methods as described herein. In some implementations, such as the one depicted in FIG. 6, the management engine 612 comprises components including a receiver 616, a monitor 618, an analyzer 620, and a controller 622. However, in other implementations, more or less components than those shown in FIG. 6 may be utilized to carry out aspects described herein. Though shown as a separate entity, the management engine 612 may take the form of one or more software stacks, modules, applications, etc., may be executed and/or located at a single location or a plurality of locations, and may be executed by one or more network components, or may provide instructions for execution at a location remote to the management engine.

The receiver 616 of the management engine 612 is generally responsible for receiving information and/or indications from various network components and/or user equipment that may be relevant for making content service decisions. For example, the receiver 616 may receive a plurality of RF signals in the uplink. Said received RF signals may comprise external interference, inter-modulation interference, inter-nodal interference, thermal noise, jamming RF, uplink transmissions from a user equipment, or the like. The receiver 616 may communicate said information to one or more of the monitors 618, the analyzer 620, or the controller 622. The monitor 618 of the management engine 612 is generally responsible for monitoring the content stored on the node 604, on the UE 602, or in other storage devices. The content may be reported to the analyzer 620 and/or the controller 622 such that content service decision can be made. The monitor 618 may communicate said information to one or more of the analyzers 620 and the controller 622.

The analyzer 620 may receive an indication from the receiver 616 and/or the monitor 618 as to the current content information related to the various UEs 602, which may include new content, stored content, deleted content, version numbers, download date/time, and other data. The analyzer 620 may determine that the requested content is available on one or more UEs 602. The receiver 616 may receive the content from the UE 602 and send such content to the analyzer 620 and/or the controller 622. The controller 622 may send or otherwise utilize the content so as to at least partially meet the request, such that the overall process may have taken less time and/or computational power by the base station 604 than transferring the content from an external content server would have taken. Thus, the efficiency of the overall system may be increased by utilizing the local storage of the content at the one or more UEs 602.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A computerized method comprising:
receiving an indication that a first user device has registered at a gateway device;
based on the first user device registering at the gateway device, receiving at the gateway device, a content report from the first user device with application content information, wherein the application content information comprises a content item that is determined to have a likelihood that is above a threshold to be requested by another user device;
determining, based on the content item size, request popularity, and cost of storage, whether the content item is to be stored at the gateway device or on the first user device;
receiving, at the gateway device, a request for the content item from a second user device communicatively coupled to the gateway device;
determining, at the gateway device, if the content item is stored at the gateway device or on the first user device; and based on the determination that the content item is stored at the gateway device, instructing the gateway device to transfer the content to the second user device, directly from the gateway device; or based on the determination that the content item is stored on the first user device, instructing the first user device to transfer the content item to the second user device, via a direct peer-to-peer connection.

2. The computerized method of claim 1, wherein the gateway device is a base station node of a communications network.

3. The computerized method of claim 2, wherein the node utilizes a user plane function of a 5G network.

4. The computerized method of claim 2, wherein each of the first user device and the second user device is a cell phone connected to the node.

5. The computerized method of claim 1, further comprising:
recording information indicative of the content item and the first user device in a list of high frequency files.

6. The computerized method of claim 5, further comprising:
receiving, at the gateway device, a third request for the content item from a third user device communicatively coupled to the gateway device;
accessing, upon receiving the second request, the list of high-frequency files to determine if the requested content item from the third request is present;
identify that the requested content item is on the first user device; and
instructing the first user device to send the content item to the third user device.

7. A non-transitory computer readable media comprising:
receiving an indication that a first user device has registered at a gateway device;
based on the first user device registering at the gateway device, receiving at the gateway device, a content report from the first user device with application content information, wherein the application content information comprises a content item that is determined to have a likelihood that is above a threshold to be requested by another user device;
based on the content item size, request popularity, and cost of storage, determining that the content item is to be stored at the gateway device or on the first user device;
receiving, at the gateway device, a request for the content item from a second user device communicatively coupled to the gateway device;
determining, at the gateway device, that the content item is stored at the gateway device; and
based on the determination that the content item is stored at the gateway device, instructing the gateway device to transfer the content to the second user device, directly from the gateway device.

8. The non-transitory computer readable media of claim 7, wherein the gateway device is a node of a communications network.

9. The non-transitory computer readable media of claim 8, wherein the node utilizes a user plane function of a 5G network.

10. The non-transitory computer readable media of claim 7, further comprising:
based on identifying the content item as a high-frequency file that is likely to be requested by another user device, recording information indicative of the content item and the first user device in a list of high-frequency files.

11. The non-transitory computer readable media of claim 10, further comprising:
receiving, at the gateway device, a third request for the content item from a third user device communicatively coupled to the gateway device;
accessing, upon receiving the second request, the list of high-frequency files to determine if the requested content item from the third request is present;
identify that the requested content item is on the first user device; and
instructing the gateway device to send the content item to the third user device.

12. A computerized system comprising:
receiving an indication that a first user device has registered at a gateway device;
based on the first user device registering at the gateway device, receiving at the gateway device, a content report from the first user device with application content information, wherein the application content information comprises a content item that is determined to have a likelihood that is above a threshold to be requested by another user device;
receiving, at the gateway device, a request for the content item from a second user device communicatively coupled to the gateway device;
determining the content report from the first user device comprises the content item requested from the second user device;
based on the determination, sending the stored content item from the first user device to the second user device via a direct peer-to-peer connection; and
storing the content item locally at the gateway device.

13. The computerized system of claim 12, wherein the gateway device is a node of a communications network.

14. The computerized system of claim 13, wherein the node utilizes a user plane function of a 5G network.

15. The computerized system of claim 12, further comprising:
based on identifying the content item as a high-frequency file that is likely to be requested by another user device, recording information indicative of the content item and the first user device in a list of high-frequency files.

16. The computerized system of claim 15, further comprising:
receiving, at the gateway device, a third request for the content item from a third user device communicatively coupled to the gateway device;
accessing, upon receiving the second request, the list of high-frequency files to determine if the requested content item from the third request is present;
identify that the requested content item is on the first user device; and
instructing the first user device to send the content item to the third user device.

17. The computerized method of claim 1, wherein the content information includes content name, version, size, and download date.

18. The non-transitory computer readable media of claim 7, further comprising:
receiving at the first gateway device, the first request for the data file from the first user device communicatively coupled to the gateway device;
determining at the first gateway device that the content item is not stored;
searching at a second gateway device for the content item; and sending the stored content item from the second gateway device to the first user device.

19. The computerized system of claim 12, wherein the gateway device comprises a radio access network node.

* * * * *